United States Patent Office 3,291,455
Patented Dec. 13, 1966

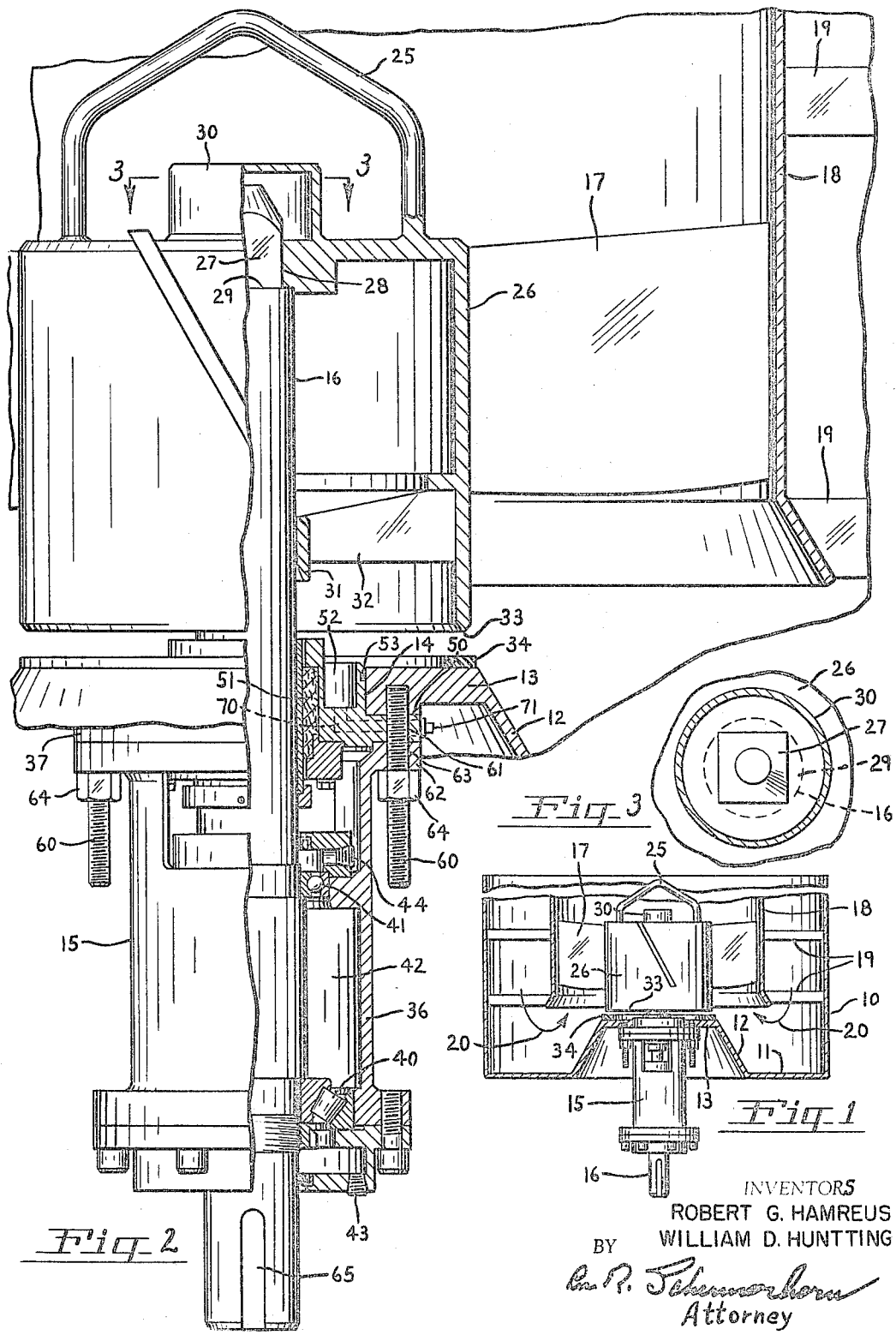

3,291,455
PUMP WITH REMOVABLE BEARING AND SEAL ASSEMBLY
Robert G. Hamreus and William D. Huntting, Portland, Oreg., assignors to Guy F. Atkinson Company, San Francisco, Calif., a corporation of Nevada
Filed Apr. 19, 1965, Ser. No. 449,088
4 Claims. (Cl. 259—108)

This invention relates to a liquid pump and has particular reference to a vertical circulating pump in a tank.

In certain industrial processes, a vertical circulating pump is employed for mixing liquids in a tank. A shaft extends through the bottom of the tank to rotate an impeller within the tank. When the bearings and seals associated with the shaft require servicing or repair, they are in an inconvenient position for such maintenance. If the pump is constructed so as to be removable through the bottom of the tank, the tank must first be drained. Even though the maintenance work on the pump may be accomplished without a prolonged shutdown, it is often undesirable to drain the tank.

The general object of the present invention is, therefore, to provide an improved pump having a bearing and seal assembly which is removable from the bottom of a tank or pump housing without draining the tank or pump housing. More particular objects are to provide a pump of the type described having a shaft which is removable from the impeller and to provide an impeller which forms a temporary plug in the bottom of the tank or pump housing to retain liquid when the pump shaft, seal and bearing are removed.

In the present arrangement, the pump shaft passes through a small opening in the bottom of the tank not much larger than the shaft. This opening is normally closed by a bearing and seal assembly which is secured to the outside of the bottom of the tank to support the shaft. The impeller is carried by the upper end of the shaft within the tank. Means are provided for lowering the bearing and seal assembly a short distance and with it the shaft and impeller without permitting the escape of liquid from the tank. During this lowering movement, a bell-shaped hub on the impeller comes to rest on a seal ring in the bottom of the tank so as to close the tank opening and retain the tank liquid.

Then the liquid within the impeller hub is drained and the bearing and seal assembly and shaft are completely removed from the tank, leaving the impeller in the tank. The parts requiring maintenance are taken to a convenient location for such work. Although the invention is illustrated in connection with a mixing tank, it is to be understood that the part designated as a tank may comprise merely a pump housing.

The invention will be better understood and additional objects and advantages will become apparent from the following description of the preferred embodiment illustrated on the accompanying drawing. Various changes may be made, however, in the details of construction and arrangement of parts, and certain features may be employed without others. All such modifications within the scope of the appended claims are included in the invention.

In the drawing:

FIGURE 1 is a side elevation view of a pump installation embodying the features of the invention with certain parts shown in section;

FIGURE 2 is an enlarged fragmentary view with parts in elevation and parts in section; and FIGURE 3 is a view on the line 3—3 in FIGURE 2.

The mixing tank 10 has a bottom wall 11 with a raised portion 12 having an annular horizontal flat portion 13 surrounding a circular opening 14. Mounted in the opening 14 is a bearing and seal assembly 15 supporting an impeller shaft 16. The upper end of shaft 16 carries an impeller 17 which rotates within a vertical flow tube 18. Tube 18 is supported in the tank by suitable means such as radial struts 19. The lower end of tube 18 is spaced above the bottom of the tank to provide an annular inlet opening to the impeller. When the pump is operating, the impeller produces an upward flow through the tube 18, drawing liquid into the lower end of the tube as indicated by the arrows 20 in FIGURE 1.

In the initial installation, the impeller is lowered onto the shaft by means of a lifting eye 25 connected with a hollow, bell-shaped hub portion 26. The shaft has a square top end 27 which has a sliding fit in a square hole 28 in the impeller hub. The impeller is supported by a shoulder 29 on the cylindrical portion of the shaft. Opening 28 is closed by a cap extension 30 on the end wall of the hub. The lower portion of the hub is equipped with a shaft ring 31 which also has a sliding fit on the shaft. This shaft ring is connected with radial struts 32 on the inside of the hub shell. The hub shell has a circular lower edge 33 spaced a short distance above a resilient sealing ring 34 on the flat portion 13 of the bottom wall of the tank.

Bearing and seal assembly 15 comprises a bearing unit 36 and a seal unit 37. The bearing unit contains a thrust bearing 40 and a radial bearing 41 for the shaft. These bearings are enclosed in an oil chamber 42 having an inlet connection 43 and an outlet connection 44 whereby oil is circulated through the bearings from an external lubrication pump. From time to time the bearings are inspected in the regular maintenance of the pump.

Seal unit 37 has a circular flange 50 which fits between the upper end of the bearing unit 36 and the under side of tank flat portion 13. Flange 50 carries a shaft seal 51 which requires adjustment or re-packing from time to time. Surrounding the shaft seal 51 is an upstanding cylindrical sleeve 52 on the flange 50 which fits in tank opening 14. This joint is sealed by a sliding seal ring 53 contained in a groove in sleeve 52. The distance from seal ring 53 to the lower edge of opening 14 is slightly greater than the gap between hub edge 33 and sealing ring 34.

The bearing unit 36 and seal unit 37 are supported by a plurality of threaded studs 60 depending from the under side of the tank about the opening 14. Flange 50 on the seal unit is provided with smooth holes 61 to receive the studs 60 and the bearing unit 36 has a radial flange 62 on its upper end provided with smooth holes 63 to receive the studs. These flanges are clamped against the bottom of the tank by nuts 64, it being noted that the studs have considerable excess length below the nuts. The flanges may be equipped with suitable gaskets, not shown.

The lower end of shaft 16 extends for a distance below bearing unit 36 and is equipped wtih a suitable driving connection 65 to receive a pulley for rotating the impeller.

When maintenance is required on the shaft bearings or shaft seal 51, the nuts 64 are backed off on the studs 60 allowing the bearing unit 36, seal unit 37, shaft 16 and impeller 17 to drop down until the lower edge 33 of the impeller hub seats on seal ring 34. This separates the liquid in the tank 10 from the interior of the impeller hub. This seating and sealing action occurs before sliding seal 53 reaches the lower edge of opening 14. Then the liquid in the impeller hub may be drained out through a passage 70 in flange 50. Normally, this passage is closed by a plug 71.

When the impeller hub has been drained, nuts 64 are lowered further and removed from the studs, permitting removal of the bearing unit, seal unit and shaft from the tank. The shaft withdraws from the impeller and all the mechanical parts are accessible for maintenance. Meanwhile, the impeller hub operates as a plug in the bottom of the tank and remains in position to receive the shaft when the parts are reassembled on studs 60.

The present arrangement may be incorporated in a pump housing the same as in the tank 10.

Having now described our invention and in what manner the same may be used, what we claim as new and desire to protect by Letters Patent is:

1. In a tank having a bottom opening, a vertical shaft extending through said opening, a bearing and seal assembly for said shaft mounted on the bottom of said tank, an impeller having a sliding fit on said shaft within said tank and arranged to seat on the bottom of said tank and close said opening when said shaft is withdrawn, a vertical peripheral wall defining the edge of said opening, a seal ring on said assembly having sliding engagement with said wall when said assembly is installed on said tank and removed from the tank, a drain passageway in said assembly having an innner end within said opening, and a removable plug in the outer end of said passageway.

2. In a tank having a bottom opening defined by a vertical cylindrical wall, a vertical shaft extending through said opening, a bearing and seal assembly for said shaft, means on the bottom of said tank for raising and lowering said assembly and shaft and for clamping said assembly against the bottom of the tank, a sleeve on said assembly extending into said opening, a seal ring on said sleeve having sliding engagement with the wall of said opening to seal said opening when said assembly is raised or lowered, and an impeller in said tank having a sliding fit on said shaft and arranged to rest on the bottom of said tank by gravity and close said opening when said shaft is withdrawn.

3. In a tank having a bottom opening, a vertical shaft extending through said opening, a bearing and seal assembly for said shaft, means on the bottom of said tank for raising and lowering said assembly and shaft and for clamping said assembly slidably against the bottom of the tank to seal said opening, a seal on said assembly cooperating with said tank when said assembly is raised and lowered, an impeller in said tank, and a hub on said impeller having a sliding fit on said shaft and arranged to rest on the bottom of said tank by gravity and close said opening when said assembly is lowered.

4. In a tank having a bottom opening, a vertical shaft extending through said opening, a bearing and seal assembly for said shaft, means on the bottom of said tank for raising and lowering said assembly and shaft and for securing said assembly to the bottom of the tank, means for sealing said assembly to the tank while the assembly is being raised and lowered, a liquid pump impeller in the tank having a sliding fit on said shaft and having a hollow hub arranged to close said opening when said assembly is lowered, and means in said assembly for draining liquid out of said hub when said hub is lowered to close said opening.

References Cited by the Examiner

UNITED STATES PATENTS

| | | | |
|---|---|---|---|
| 2,296,581 | 9/1942 | Smith et al. | 259—107 |
| 2,641,971 | 6/1953 | Ellis | 259—107 |
| 3,088,416 | 5/1963 | Danis | 103—111 |

WALTER A. SCHEEL, *Primary Examiner.*

ROBERT W. JENKINS, *Assistant Examiner.*